United States Patent [19]

Napolitano

[11] 4,421,325

[45] Dec. 20, 1983

[54] SEAL WITH DUAL METALLIC RINGS HAVING CONTACTING LIPS

[75] Inventor: Pellegrino E. Napolitano, Middletown, N.J.

[73] Assignee: Hudson Engineering Company, Bayonne, N.J.

[21] Appl. No.: 450,367

[22] Filed: Dec. 16, 1982

[51] Int. Cl.³ .................. F16J 15/28; F16J 15/32; F16J 15/48

[52] U.S. Cl. .......................... 277/27; 277/152; 277/212 R; 277/236

[58] Field of Search .......... 277/27, 152, 153, 123–125, 277/205, 212 R, 212 C, 212 F, 236

[56] References Cited

U.S. PATENT DOCUMENTS

| 2,761,710 | 9/1956 | Rudner | 277/152 X |
| 2,783,106 | 2/1957 | Barnhart | 277/236 X |
| 3,054,422 | 9/1962 | Napolitano | 137/509 |
| 3,602,520 | 8/1971 | Wallis | 277/27 |
| 4,192,518 | 3/1980 | Arendt | 277/27 |

FOREIGN PATENT DOCUMENTS

| 512096 | 8/1939 | United Kingdom | 277/212 R |
| 723275 | 3/1980 | U.S.S.R. | 277/152 |
| 836428 | 6/1981 | U.S.S.R. | 277/152 |

Primary Examiner—Robert S. Ward, Jr.
Attorney, Agent, or Firm—Fleit, Jacobson, Cohn & Price

[57] ABSTRACT

A fluid connection incorporating a metallic seal defined by a pair of cooperating, obliquely oriented sealing lips. The lips taper in thickness and are each carried by one of the connection elements to permit contact therebetween at their respective tips. A passageway from the main fluid conduit is provided to permit the fluid pressure to act against the sealing lips to urge them into tighter contact and thereby provide increased sealing force as the fluid pressure increases.

12 Claims, 3 Drawing Figures

U.S. Patent      Dec. 20, 1983      4,421,325
FIG. 1
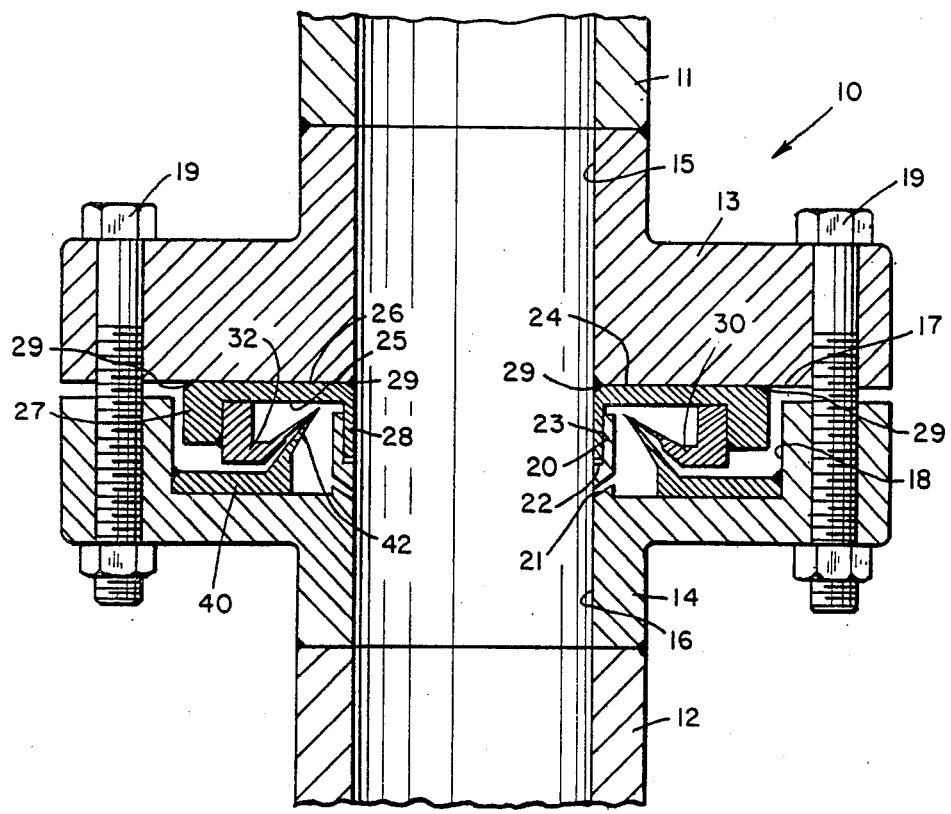
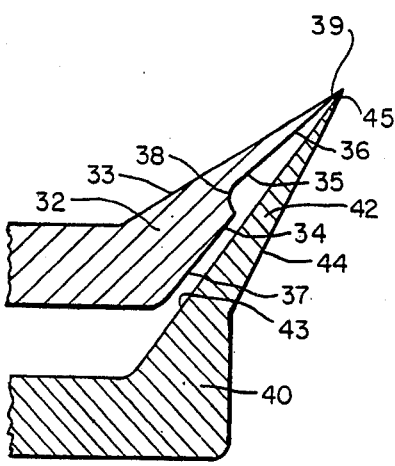
FIG. 2
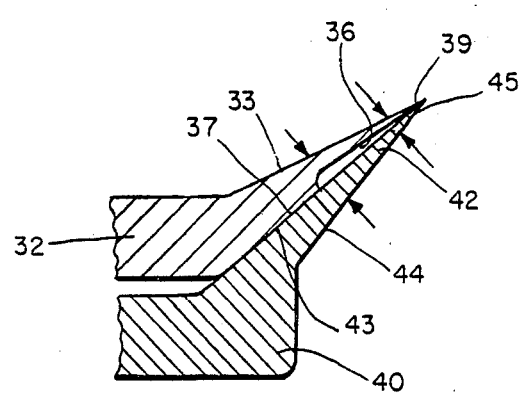
FIG. 3

SEAL WITH DUAL METALLIC RINGS HAVING CONTACTING LIPS

BACKGROUND OF THE INVENTION

This invention relates to fluid system seals, and more particularly to a metal-to-metal seal capable of sustaining its sealing qualities under extreme temperature and pressure conditions without fluid leakage.

The interconnection of numerous elements of fluid-carrying systems frequently involves the use of flanges to permit the elements to be bolted together to form a portion of a flow passageway of a fluid flow system. The use of resilient seals between such elements to permit fluid-tight interconnections in such fluid-carrying systems is well known. Among the more common types of resilient seal materials are cork, rubber, synthetic elastomers, and the like. Typically, resilient seals are positioned between two metallic elements forming a part of the fluid system, and in such a way as to completely surround the flow channel so that leakage does not take place.

Resilient seals, which most often are in the form of flat gaskets, O-rings, and the like, have the advantage of being able to expand and contract as the system itself expands and contracts because of temperature or pressure changes. However, most of the more common resilient seal materials either soften excessively, melt, break down, or otherwise permit leakage when subjected to high temperatures, such as temperatures over about 400° F. Thus, the utility of such resilient seals is limited to the extent that they can only effectively be used under moderately high temperature conditions. Similarly, under low temperature conditions of the order of about −65° F. or so, the commonly used resilient seal materials become less effective by reason of loss of resilience and flexibility. However, if suitable seals are not used and the various elements of the fluid system are merely bolted together, there is the danger of fluid leakage and of distortion of the metal elements as a consequence of expansion and contraction caused by temperature excursions. If the elements are too rigidly interconnected, the expansion and contraction stresses in the system, which build up with temperature extremes, could cause a break in the system with a consequent loss of the fluid and possible inoperability of the system. The foregoing temperature effects are magnified when high operating pressures are superimposed upon such a fluid-carrying system.

In addition to the temperature effects in existing sealing arrangements, as pressures within the fluid-carrying system increase, the pressure effects on existing seals operate to cause separation of the sealing elements, and thus the propensity for leakage increases as the pressure increases.

SUMMARY OF THE INVENTION

It is therefore an object of the present invention to provide a seal for a fluid system wherein the seal can withstand both extreme temperatures and high pressures without leakage.

It is another object of the present invention to provide an improved extreme temperature seal which can accommodate expansion and contraction of the fluid system while maintaining its sealing qualities.

It is a further object of the present invention to provide a fluid seal wherein the sealing effect increases as the pressure of the fluid within the system increases, to provide a leak proof system over a wide range of operating pressures.

Briefly stated, in accordance with one aspect to the present invention, a seal for a fluid system is provided wherein a pair of flexible metallic members cooperate to form a seal between two elements of the fluid system. A first annular ring is secured to one of the elements in fluid-tight relationship therewith and is spaced radially outwardly of the flow passageway. The first annular ring includes a first inwardly directed lip which is oriented at an oblique angle to the axis of the flow passageway. A second annular ring is secured to the other element of the connection in substantially fluid-tight relationship therewith and is also spaced radially outwardly of the flow passageway. The second annular ring includes a second inwardly directed lip which is disposed at a second oblique angle to the axis of the conduit. The inner edges of the inwardly directed lips are in contact to provide a fluid-tight seal.

BRIEF DESCRIPTION OF THE DRAWING

FIG. 1 is a fragmentary cross-sectional view showing a flanged connection in a fluid-carrying system and incorporating a seal in accordance with the present invention.

FIG. 2 is an enlarged, fragmentary cross-sectional view of a portion of FIG. 1 showing the area of contact of the sealing elements of the present invention when the same are subjected to a low fluid pressure.

FIG. 3 is an enlarged, fragmentary cross-sectional view similar to FIG. 2 but showing the sealing elements of the present invention when the same are subjected to a high fluid pressure.

DESCRIPTION OF THE PREFERRED EMBODIMENTS

Referring now to the drawing, and particularly to FIG. 1 thereof, there is shown a flanged connection 10 in a fluid-carrying system. The arrangement shown is the junction of a pair of spaced, coaxial fluid conduits, including a first tubular conduit 11 and a second tubular conduit 12. At each of the opposed ends of tubular conduits 11, 12 there is secured an extension in the form of an outwardly directed flange 13, 14, respectively, which can be either integral with the tubular conduits or separately attached thereto in fluid-tight relationship, as by means of welding, brazing, threads, or the like.

Each flange 13,14 includes an opening 15,16, respectively, which extends therethrough and is coaxial with the adjacent flow passageway within tubular conduits 11,12 to which it is attached. As illustrated in the drawing, flange 13 includes a substantially flat face 17 which is perpendicular to the axis of the flow passageway and which faces flange 14. Flange 14 includes a seal housing in the form of an annular recess 18 disposed opposite face 17 in flange 13. Flanges 13,14 can be bolted together with bolts 19 in the conventional manner, except that bolt torque preferably is closely controlled, as will hereinafter be explained.

Recess 18 in flange 14 surrounds the flow passageway and is separated therefrom by an axial collar 20 which defines a part of flange opening 16. Collar 20 includes at least one passageway 21, which provides communication between annular recess 18 and the fluid passageway to permit the fluid pressure to act on the seal and increase the sealing force in a manner to be hereinafter described. Collar 20 includes a radially outwardly directed edge 22 which terminates at an inner annular wall 23 to define a recessed inner surface substantially coaxial with the flow passageway.

Rigidly secured to flange 13 in fluid-tight relationship therewith is a first annular ring 24, which has an outer diameter smaller than the outer diameter of annular recess 18 in flange 14, and which has an inner diameter substantially equal to that of the flow passageway. Ring 24 includes a first face 25 and a second face 26, first face 25 including an outer flange 27 extending substantially perpendicularly thereto to define an abutment. An inner, axially directed flange 28 is provided which serves as a locating and positioning sleeve. Second face 26 of ring 24 can be secured to the face of flange 13 as by means of welds 29 shown in FIG. 1. Positioned against the abutment defined by flange 27, and secured thereto as by welding, is a first annular sealing element 30 which includes a tapered, inwardly directed lip 32 inclined at an oblique angle with respect to the axis of the flow passageway. As best seen in FIG. 2, lip 32 includes an outwardly directed face 33 and an inwardly directed face 34 and is thinnest at its innerpost point relative to the flow axis. Inwardly directed face 34 includes an annular relief recess 35 defined by a first surface 36, which is inclined relative to the flow axis at a greater angle than that at which the second surface 37 is inclined. First and second surfaces 36,37 are interconnected by a fillet 38. Second surface 37 preferably is so oriented that if it is extended toward the flow axis it will intersect first surface 36 at the tip 39 of lip 32.

Secured within annular recess 18 in second flange 14, as, for example, by means of welding, is a second annular ring 40, which includes a tapered, inwardly directed lip 42 positioned at an oblique angle with respect to the flow axis. The lip includes a outer face 43 and inner face 44 and has its point of minimum thickness at the tip 45.

The respective lips 32,42 of the first and second sealing elements 30,40 are preferably formed from metallic materials in order that they can withstand fluid temperatures in the vicinity of about 400° F. or greater. Flexibility of the material is desirable, as is resistance to corrosion, and consequently a highly preferred material for the annular seal elements 30,40 is stainless steel.

In operation, flanges 13,14 are coaxial, with 28 serving as a pilot to engage and fit within collar 20 formed in flange 14. The two flanges are brought together to the point where the innermost tips 39,45 are in contact, as generally illustrated in FIG. 2. Thereupon the bolts 19 securing the flanges together are tightened to a point where the outer edges of surfaces 36,43 are in firm contact, so as to be able to accommodate some axial expansion and contraction of the flow conduits 11,12 as the temperature of the system increases or decreases, respectively.

When the system expands, and flanges 13,14 move closer together, surfaces 37 and 43 will also move together into greater surface contact to the position illustrated in FIG. 3. At that point the two sealing lips are in maximum contact at tips 39,45 and along faces 37 and 43. The annular recess between surfaces 36 and 42 prevents complete contact between the two sealing lips in order to facilitate separation thereof when the temperatures in the system diminish and the conduits contract. Although the annular recess is herein disclosed as positioned in a particular one of the sealing lips, it can be positioned in the other sealing lip, if desired.

When the system contracts, and flanges 13,14 move further apart, surfaces 37 and 43 will move apart but the tips 39,45 will remain in contact because of the flexibility of the sealing lips.

In addition, as the pressure within the system increases, passageway 21 permits that pressure to act on and thereby increase the sealing force between the lips as can be seen more clearly in FIG. 3. The pressure acts upon the faces 33 and 44 in the direction of the arrows, and serves to urge the sealing lips together into tighter engagement. Thus the increase in fluid pressure serves to increase the contact pressure between the sealing lips, and the seal of the present invention acts in a manner substantially different from other type of seals, wherein the effect of an increase in fluid pressure operates to diminish the sealing effect.

Although herein described in the context of a flanged connection, those skilled in the art will recognize that the application of the present invention is not limited to use with flanges, and it can also be used in interconnections with pumps, motors, actuators, and the like.

While particular embodiments of the present invention have been illustrated and described, it will be apparent to those skilled in the art that various changes and modifications can be made without departing from the spirit and scope of the present invention, and it is intended to encompass within the appended claims all such changes and modifications that fall within the scope of the present invention.

What is claimed is:

1. A seal for use with fluid-carrying elements of a fluid system which define a portion of a fluid passageway, said seal comprising:
   (a) a first annular ring secured to one of said elements in substantially fluid-tight relationship therewith and spaced radially outwardly of said flow passageway, said first annular ring including a first inwardly directed lip disposed at an angle to the axis of said passageway;
   (b) a second annular ring secured to the other of said elements in substantially fluid-tight relationship therewith and spaced radially outwardly of said flow passageway, said second annular ring including a second inwardly directed lip disposed at an angle to the axis of said passageway; and
   (c) said first inwardly directed lip contacting said second inwardly directed lip at least at the innermost portion thereof relative to the fluid passageway axis.

2. The seal of claim 1 wherein said angles are oblique to the axis of the flow passageway adjacent said seal.

3. The seal of claim 2 wherein said lips are positioned within an enclosure defined by the respective connection elements, and said elements include axially arranged, cooperating portions to provide a substantially continuous flow path within said fluid passageway.

4. The seal of claim 3 wherein one of said cooperating portions includes at least one passageway extending from the flow passageway to said enclosure to permit fluid pressure to act upon said lips to urge them into tighter contact as the fluid pressure increases.

5. The seal of claim 4 wherein each of said inwardly extending lips tapers in thickness.

6. The seal of claim 5 wherein said inwardly extending lips are in contact at the innermost tip portions thereof relative to said flow passageway.

7. The seal of claim 6 wherein one of said lips includes an inwardly directed face opposite said other lip with an annular recess therein whereby when said lips are brought into tight engagement by high pressures an annular chamber is defined between said lips, said chamber serving to facilitate the separation of said lips from each other upon reduction of the fluid pressure acting thereon.

8. The seal of claim 7 wherein said annular recess is defined by a pair of surfaces defining said inwardly directed face, each of said surfaces inclined at a different oblique angle to the flow passageway axis and interconnected intermediate the ends of said inwardly directed face.

9. The seal of claim 6 wherein one of said lips includes an outwardly directed face opposite said other lip with an annular recess therein, whereby when said lips are brought into tight engagement by high pressures an annular chamber is defined between said lips, said chamber serving to facilitate the separation of said lips from each other upon reduction of the fluid pressure acting thereon.

10. The seal of claim 9 wherein said annular recess is defined by a pair of surfaces defining said outwardly directed face, each of said surfaces inclined at a different oblique angle to the flow passageway axis and interconnected intermediate the ends of said outwardly directed face.

11. A fluid system seal for extreme temperature and pressure conditions, said seal comprising a pair of flexible lips, each of which is associated with one portion of a fluid connection; each of the lips spaced outwardly from a flow channel and positioned angularly relative to each other to permit contact at their respective outer tips; means to permit communication of fluid pressure to said lips adjacent their point of contact so that the pressure acts to urge the lips together into tight engagement.

12. The seal of claim 11 wherein said flexible lips are metallic and adapted to withstand corrosive environments.

* * * * *